United States Patent
Cartry

[11] Patent Number: 5,555,280
[45] Date of Patent: Sep. 10, 1996

[54] PROCESS AND DEVICE FOR PRODUCING A LEAKPROOF PROTECTIVE COATING ON A SURFACE OF A NUCLEAR REACTOR COMPONENT

[75] Inventor: Jean-Pierre Cartry, Lyons, France

[73] Assignee: Framatome, Courbevoie, France

[21] Appl. No.: 366,572

[22] Filed: Dec. 30, 1994

[30] Foreign Application Priority Data

Dec. 30, 1993 [FR] France ................................. 93 15931

[51] Int. Cl.$^6$ ........................................................ G21C 19/00
[52] U.S. Cl. ...................... 376/260; 376/414; 376/451; 376/204; 376/402
[58] Field of Search .................................. 376/260, 414, 376/451, 204, 402; 118/670; 219/516, 519, 524, 555; 427/68; 75/10.1, 10.2, 425

[56] References Cited

U.S. PATENT DOCUMENTS

| | | | |
|---|---|---|---|
| 3,773,547 | 11/1973 | Spoor et al. | 117/93.31 |
| 3,921,440 | 11/1975 | Toth | 73/67.85 |
| 3,971,633 | 7/1976 | Wolfla et al. | 29/195 |
| 4,440,339 | 4/1984 | Tamai et al. | 228/119 |
| 4,642,440 | 2/1987 | Schnackel et al. | 219/121 PP |
| 4,672,852 | 6/1987 | Gugel et al. | 73/622 |
| 4,939,337 | 7/1990 | Gente | 219/125.11 |
| 5,022,936 | 6/1991 | Tsujimura et al. | 148/135 |
| 5,274,683 | 4/1993 | Broda et al. | 376/260 |
| 5,359,172 | 10/1994 | Kozak | 219/121.64 |
| 5,443,201 | 8/1995 | Cartry | 228/119 |

FOREIGN PATENT DOCUMENTS

| | | |
|---|---|---|
| 2495734 | 6/1982 | France . |
| 2509640 | 1/1983 | France . |
| 2558767 | 2/1985 | France . |

OTHER PUBLICATIONS

"Cinetique d'endommagement en fatigue thermique d'un alliage base cobalt" by Farcy et al, Memories et Etudes Scientifiques Revue de Metallurgie, Feb. 1987.
Abstracts, DD136114 A 790620 DW7933 Bubenik et al.
"Equipment for Construction and Repair of Pipework" by H. Rohrich, Kerntechnik 51 (1987).

*Primary Examiner*—Donald P. Walsh
*Assistant Examiner*—Meena Chelliah
*Attorney, Agent, or Firm*—Pollock, Vande Sande & Priddy

[57] ABSTRACT

The surface of the component (1, 2) to be protected is scanned, a jet of semitransferred arc plasma (17) into which a metal powder is introduced. The process can be applied to the production of a layer of coating (18) on the outer surface of a region of welding connection (3) between a nozzle (1) and a primary pipe (2) of a pressurized water nuclear reactor or to the coating of the inner surface or the connecting surface of an adapter passing through the reactor vessel head.

11 Claims, 4 Drawing Sheets

PROCESS AND DEVICE FOR PRODUCING A LEAKPROOF PROTECTIVE COATING ON A SURFACE OF A NUCLEAR REACTOR COMPONENT

FIELD OF THE INVENTION

The invention relates to a process and a device for producing a leakproof protective coating on a metal substrate, and especially on a part of the surface of a component of a nuclear reactor, such as a pressurized water nuclear reactor.

BACKGROUND OF THE INVENTION

Pressurized water nuclear reactors comprise a primary circuit inside which water circulates at a very high pressure of the order of 155 bars and at a very high temperature of the order of 310° C.

Some parts of the components situated in the primary circuit of the nuclear reactor are particularly exposed to cracking corrosion in contact with the water of the primary circuit or in contact with external agents, as a result of the temperature prevailing in the primary circuit.

In particular, the component parts comprising a bimetallic connection are exposed to corrosion of this type.

This applies to the regions of welding between the pipes of the primary circuit and the nozzles connecting these pipes to the vessel, which are internally coated with a layer of stainless steel; the passages through the closure head and bottom of the vessel which consist of tubing made of a nickel alloy such as Inconel 600; the regions of welding of these passages to the closure head or bottom of the vessel; and, more generally, all the regions of the primary circuit comprising coatings or welds or made of nickel alloy.

Cracks have been detected in some parts of the primary circuit of the nuclear rector, after the reactor has been operating for some time, and in particular in regions of a certain heterogeneity of composition, such as the regions of welding or the regions coated with a stainless steel or a nickel alloy. Cracks have also been detected in some passages through the closure head or bottom of the vessel, in the regions of welding on the wall of the closure head or of the bottom of the vessel.

When cracks are detected, it is necessary either to repair the damaged region or to replace the component comprising a damaged region.

The repair operations as well as the operations of replacing components may be very costly and require extended shutdowns of the nuclear reactor.

It is therefore desirable to have available processes for preventive treatment of those regions of the primary circuit of a nuclear reactor which are most exposed to cracking when the reactor is in operation.

Until now there has been no known extremely efficient process making it possible to prevent or to limit cracking of the sensitive regions of the primary circuit of a nuclear reactor, and in particular of regions of heterogeneous composition.

Coating processes which are known and generally employed for protecting metal surfaces against corrosion have not been found effective for protecting heterogeneous regions of the primary circuit of a nuclear reactor or for protecting the nickel alloy surfaces of the primary circuit, which exhibit a certain sensitivity to cracking corrosion.

FR-A-2.509.640, discloses a process of manufacturing a bi-metallic part by coating a piece made of structural steel with a harder layer. The coating is obtained by welding so that the piece melts superficially during the coating.

The coating can be produced by means of a semitransferred arc plasma torch. The coating layer is more than 6 mm thick and can be as thick as 16 mm. The coated piece must be heat-treated by tempering or quenching and tempering.

Such a process cannot thus be used for producing a leakproof protective coating on a surface of a component of a nuclear reactor.

SUMMARY OF THE INVENTION

The object of the invention is therefore to propose a process for producing a leakproof protective coating on a surface of a nuclear reactor component intended to bear cracking during operation of the nuclear reactor, by scanning of the surface of the component with a jet of a semi-transferred arc plasma torch in which is introduced a metal powder, which makes possible to prevent cracking of the component in particular in regions of welding connection or in coated regions.

To this end, the plasma jet, the introduction of metal powder in the plasma jet and the scanning are controlled in such a manner that the metal powder is ejected and fixed on the surface by ejection without melting the surface of the component, in the form of a dense homogeneous and leakproof coating layer of a thickness at most equal to 1 mm.

In particular, to protect regions of the primary circuit of a nuclear reactor comprising welds or heterogeneous coatings made of alloy containing nickel, a metal powder containing nickel is introduced into the jet of semitransferred arc plasma.

BRIEF DESCRIPTION OF THE DRAWINGS

In order that the invention maybe more clearly understood, a description will now be given, by way of example and with references to the accompanying drawings of several embodiments of use of the process in accordance with the invention for protecting regions of the primary circuit of a pressurized water nuclear reactor, and of the corresponding devices for making use of the process.

DETAILED DESCRIPTION

The structure and the operation of a semitransferred arc plasma torch will now be described with reference to FIG. 1.

Figure 1:
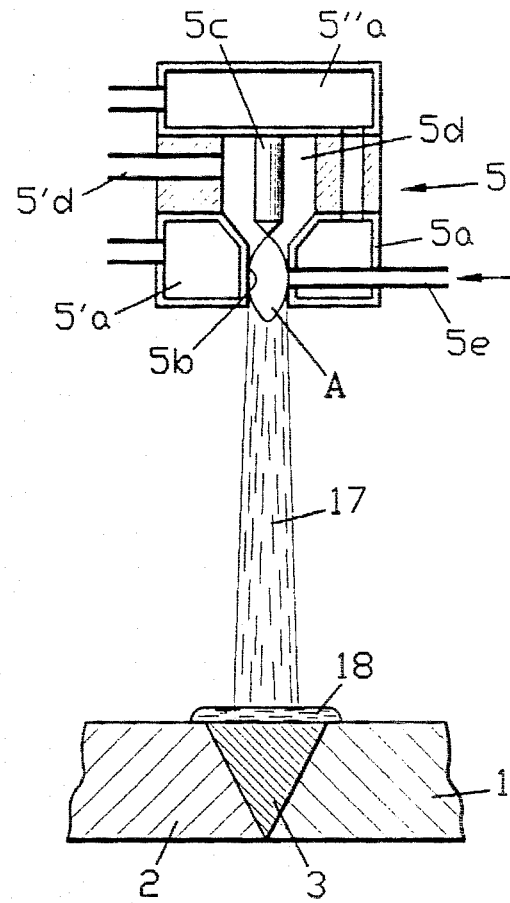
FIG. 1 is a schematic view of a semitransferred arc plasma torch.
Figure 2:
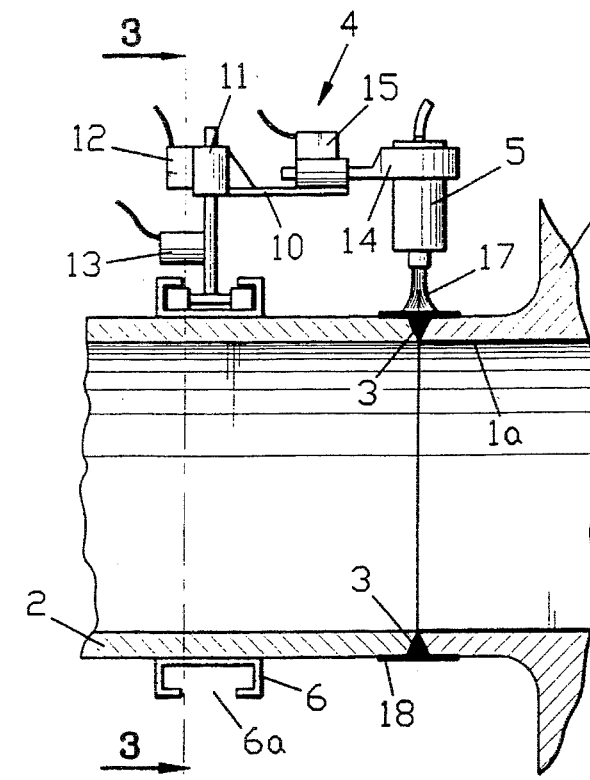
FIG. 2 is a view in section through an axial plane of a region of connection between a primary coolant pipe and a nozzle of a pressurized water nuclear reactor during an coating of the region of connection using a process according to the invention.

FIG. 1 shows the end part of the nozzle of the plasma torch 5 shown in FIG. 2 and employed for performing the coating by a process in accordance with the invention of the connection region comprising the weld 3, of a nozzle 1 and of a pipe 2 of a pressurized water nuclear reactor.

The nozzle of the plasma torch 5 comprises an outer enclosure 5a and a tubular anode 5b arranged in the central part of the enclosure 5a.

The enclosure 5a of the torch and the tubular anode 5b define an annular chamber 5'a connected to a delivery conduit for cooling water and arranged at the periphery of the anode.

The enclosure 5a also defines a second chamber 5"a connected to both the annular chamber 5'a and an exit conduit for the cooling water. Cooling of the torch 5 by water circulation in chambers 5'a and 5"a can thus be ensured.

The central part of the enclosure 5a of the torch 5 is made of an insulating material and defines a central chamber 5d around the cathode 5c. The central chamber 5d is connected by means of a conduit 5'd to a source of argon under pressure.

A conduit 5e passing through the annular cooling chamber 5'a opens into the interior of the tubular anode 5b.

The torch 5 is connected to a source of electrical current so that an arc A is struck between the cathode 5c and the anode 5b. The components 1, 2 and 3 to be coated are taken to an anode potential.

Argon under pressure is introduced through the conduit 5'd and passes through the arc A inside the tubular anode 5b. A plasma is thus formed by ionization of argon in the electrical arc A.

The gas under pressure, which is decompressed in the chamber 5d and heated in contact with the arc A, produces a plasma jet 17 of very high velocity.

A metal powder, for example a nickel alloy powder suspended by a carrier gas, which may be argon, is injected through the conduit 5e, inside the anode 5b, into the arc A.

The powder is melted by the arc and suspended in the plasma jet 17.

In contact with the components 1 and 2 in their region of connection 3, the plasma jet 17 forms a nickel alloy coating layer 18.

The process of melting with the semitransferred arc plasma makes it possible to spray a molten powder onto the components, so as to cover them with a coating layer.

In the process according to the invention, the jet of the plasma torch, the gap between the nozzle of the plasma torch and the surface to be coated, and the scanning conditions are controlled so as to ensure bonding of the coating layer without remelting of the components. In particular, the gap between the nozzle and the surface of the components to be coated must be between 20 and 80 mm in the process of the invention, whereas the gap is generally under 8 mm in prior art coating processes. The components need not be heat-treated after coating.

In addition, the coating is produced under an inert gas, such as argon.

Confinement of the gases can be assured by flexible partitioning.

The molten metal originating from the powder injected into the arc through the channel of the anode 5b is sprayed by the plasma-forming gas introduced under pressure through the conduit 5'd, onto the surface of the components to be covered, and is thereby brought into pressurized contact with and spread against the surface of the components to produce a homogeneous and perfectly leakproof layer. In the process in accordance with the invention, which uses the semitransferred arc technique, a gas under pressure ensures the spraying of a metal remelted in the arc onto the components to be covered. This process must be distinguished from the transferred arc plasma process, in which no gas under pressure is employed for spraying the molten covering metal, and in which a true weld is produced with remelting of the components and melting of the added metal.

In the case of the semitransferred arc process according to the invention, the distance between the torch and the component to be coated is generally much greater than the torch-component distance in the case of the transferred arc process according to the prior art. This distance is between 20 and 80 mm, and may be of the order of 30 mm in the case of the coating of the outer surface of components such as nozzles or primary coolant pipes 2, 3.

The torch 5 may have small dimensions, for example an outer diameter of the order of 15 mm and a length of the order of 50 mm.

Figure 3:
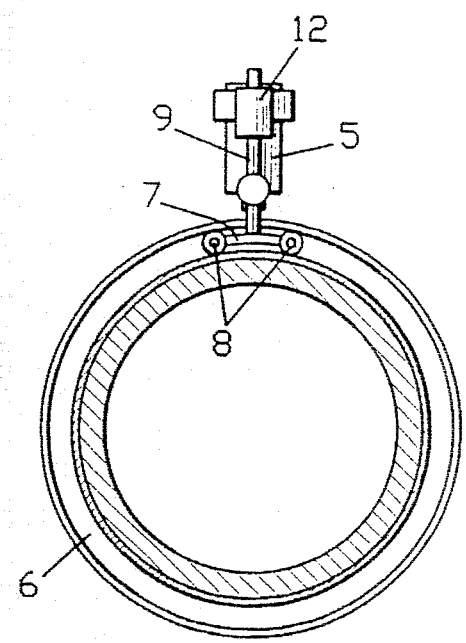
FIG. 3 is a section view along line 3—3 of FIG. 2.

FIGS. 2 and 3 show a portion of a nozzle 1 of the vessel of a nuclear reactor, to which is connected the end of a large-diameter pipe 2 of the reactor's primary system.

The nozzle 1, which is of the same material as the nozzle support ring of the vessel, is made of low-alloy steel and coated internally with a layer of stainless steel 1a.

The pipe 2 of the primary system is welded end-to-end to the end of the nozzle 1 by means of a weld bead 3.

The weld 3 ensures the connection between the regions of the components 1 and 2 which are of different compositions and structures. The weld 3 is therefore a region of heterogencity for the components 1 and 2 of the reactor's primary system.

While the nuclear reactor is in operation, water at 310° C. circulates inside the pipe 2 and the nozzle 1, with the result that the thick wall of the components of the nuclear reactor consisting of the nozzle 1 of the vessel and of the pipe 2 is brought to an elevated temperature which can vary between the ambient temperature and the temperature of 310° C. between the cold and hot states of the nuclear reactor. The outer surface of this wall is furthermore in contact with atmospheric air.

It has been possible to observe cracking initiations on the outer surface of the heterogeneous region connecting a nozzle and a primary coolant pipe.

The process for leakproof coating in accordance with the invention makes it possible to avoid any contact between the outer surface of the heterogeneous region 3 and atmospheric air or other external agents while the reactor is in operation. The coating process in accordance with the invention makes it therefore possible to apply a preventive treatment against cracking at the welds of the primary coolant pipes to the nozzles of a pressurized water nuclear reactor vessel.

As can be seen in FIG. 2, to make use of the process in accordance with the invention, a device 4 is employed, comprising a semitransferred arc plasma torch 5 with a feed of the plasma jet with a metal powder based on nickel and chromium.

The plasma torch 5 is of the general type shown in FIG. 1 and enables use of the process for producing a semitransferred arc plasma.

The device 4 comprises a rail 6 permanently fastened, for example by welding, around the end part of the primary system pipe 2, in the vicinity of the region connecting this pipe to a nozzle 1 of the pressurized water nuclear reactor vessel. The rail 6 has a profiled shape and a rectangular meridian section comprising an opening 6a on the outer side of the section. A trolley 7 comprising wheels 8 is mounted for movement inside the profiled rail 6 of annular shape so that the wheels 8 move with a small clearance inside its two C-shaped end parts.

The trolley 7 carries a column 9 on which a platform 10 is mounted so that it slides by means of a sleeve 11 slidingly mounted on the column.

A motor 12 allows the platform 10 to be moved in translation in either direction, longitudinally of the column 9.

A second driving motor 13 allows the trolley 7 to be driven so that it moves inside the annular rail 6 coaxial with the primary coolant pipe 2 and the nozzle 1.

A support 14 to which the plasma torch 5 is fastened is mounted on the platform 10, so that it slides in a direction perpendicular to the longitudinal direction of the column 9.

A motor 15 allows the support 14 to be driven in translation in either direction in the direction perpendicular to the column 9.

The motors 12, 13 and 15 and the torch 5 are connected by cables to suitable sources of electrical energy allowing the motors and the torch to be powered.

In addition, the torch 5 is connected by pipes to a source of inert gas and to a receptacle dispensing powder of an alloy containing nickel and chromium, which is incorporated into the plasma jet.

When powered, the torch 5 produces a plasma jet 17 pointed towards the outer surface of the weld region 3 of the pipe 2.

Circumferential scanning of the entire outer surface of the weld region 3 is effected by moving the trolley 7 inside the rail 6 around the pipe 2.

The distance between the exit nozzle of the torch 5 and the outer surface of the pipe 2 can be adjusted by the motor 12 for moving the platform 10 along the column 9, to a value of about 30 mm.

In addition, scanning of the weld region in the lengthwise direction can be carried out by moving the support 14 with the aid of the motor 15.

The moving device 4 equipped with the welding torch 5 makes it possible to produce a layer of coating 18 made of nickel-chromium alloy on the outer surface of the weld region 3 and on the outer surface of the parts connecting the nozzle 1 and the pipe 2.

The technique of coating with a jet of semi-transferred arc plasma with injection of a powder of a nickel-chromium alloy into the plasma jet makes it possible to produce a perfectly adherent and perfectly leakproof proof layer 18 above the region of connection of the two components of the reactor, consisting of the vessel nozzle 1 and the primary coolant pipe 2.

The coating of the outer surface of the region of connection between the nozzle 1 and the pipe 2 of the nuclear reactor is preferably produced in a preventive manner, before the nuclear reactor is brought into operation, at the end of the operations for connecting the vessel and the primary system pipework.

When the nuclear reactor is in operation, the completely leakproof layer 18 makes it possible to insulate the outer surface of the pipe 2 and of the nozzle 1 in their connection region, and this makes it possible to limit and practically prevent any cracking of the connection region in service.

Figure 5:
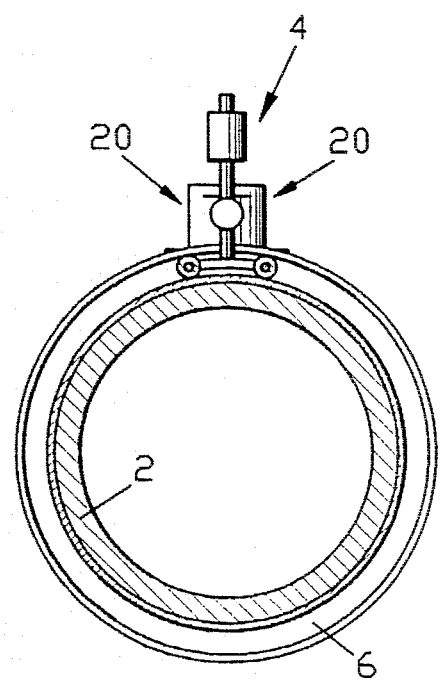
FIG. 5 is a section view along line 5—5 of FIG. 4.
Figure 4:
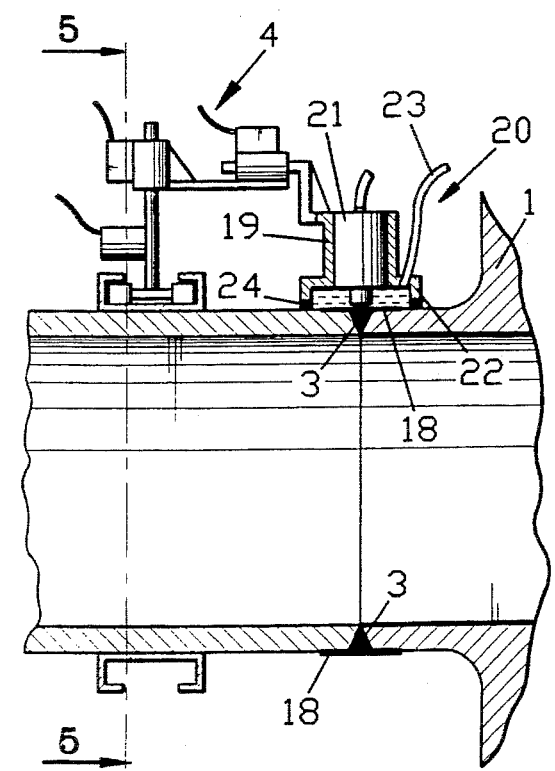
FIG. 4 is a view in axial section of a region of connection of a primary coolant pipe with a nozzle of a pressurized water nuclear reactor, during inspection of the coating in the connection region by a process in accordance with the invention.

FIGS. 4 and 5 show the device 4 for moving the torch 5, already described with reference to FIGS. 2 and 3, during an inspection operation in the course of which the moving device 4 is employed to move an ultrasonic testing head 20 around the region of connection of the pipe 2 and of the nozzle 1, after production of the protective leakproof coating layer 18 using the process of the invention.

The testing head 20 comprises a probe support 19 into which is fitted the ultrasonic probe 21 consisting of a transmitter-receiver transducer connected by a cable to a source of supply of electrical current.

The probe support 19 of the testing head is extended in the form of a wall 22 of a container whose end edge is placed in leakproof contact with the outer surface of the pipe 2 and of the nozzle 1, on either side of the weld 3 and of the side edges of the coating layer 18, by means of seals 24 consisting of brushes or flanges made of elastomeric material which come into rubbing contact with the outer surface of the pipe 2 and of the nozzle 1 during the rotational movement of the testing head 20 driven by the handling device 4.

Water is introduced through a pipe 23 into the space defined by the wall 22 and the outer surface of the pipe 2 and of the nozzle 1, around the coating layer 18. The handling device 4 makes it possible to produce the orbital movement of the testing head 20 around the weld region 3, so as to check the whole of the coating layer 18.

Furthermore, the means for moving the device 4 in translation make is possible to adjust the position of the test probe and to carry out a scan of the layer 18 by the beam of ultrasound produced by the transducer of the probe 19.

An inspection is thus carried out of the homogeneity of the layer 18. It has been found that the layer 18 deposited by the process in accordance with the invention exhibits very good homogeneity and perfect leakproofing.

Figure 6:
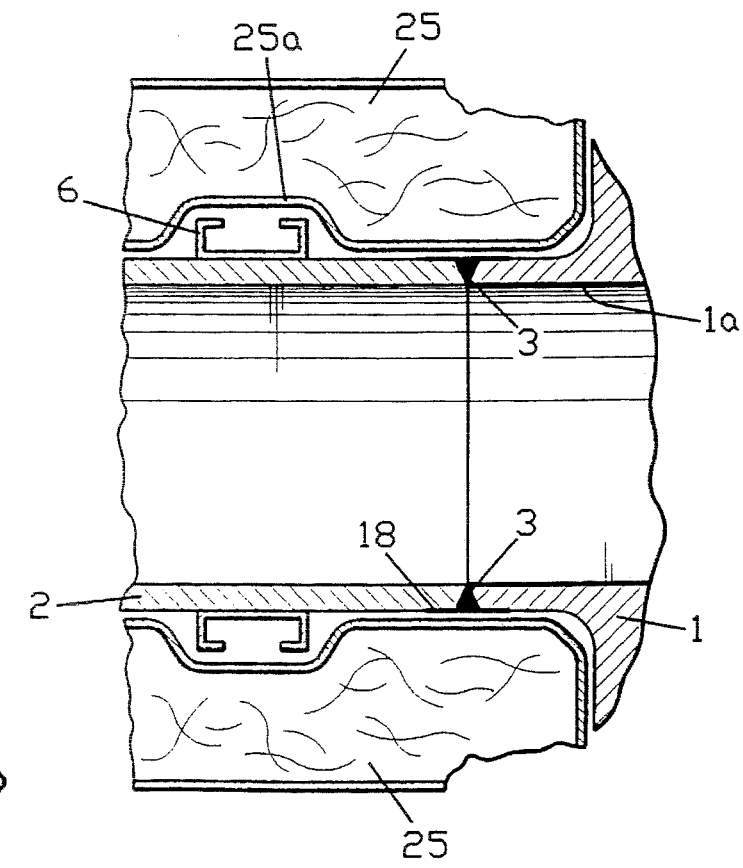
FIG. 6 is a view in axial section, similar to the views of FIGS. 2 and 4, showing the connection region of the nuclear reactor in service.

FIG. 6 shows the region connecting the nozzle 1 and the pipe 2 during the operation of the nuclear reactor.

In order to insulate the pipe and the nozzle thermally from the external environment, a lagging 25 of great thickness is arranged around the outer surface of the nozzle and of the pipe. The lagging 25 comprises a hollow part 25a making it possible to accommodate the guiding rail 6 employed for moving the plasma probe and the testing head, by virtue of the handling of the coating layer for leakproof protection 18 of the outer surface of the region connecting the nozzle 1 and the pipe 2.

During shutdowns of the nuclear reactor, after dismantling the lagging 25, it is therefore possible to inspect and possibly coat connection region. These operations can be carried out very rapidly and very easily as a result of the permanent presence of the guiding rail 6 on the pipe 2.

Figure 7:
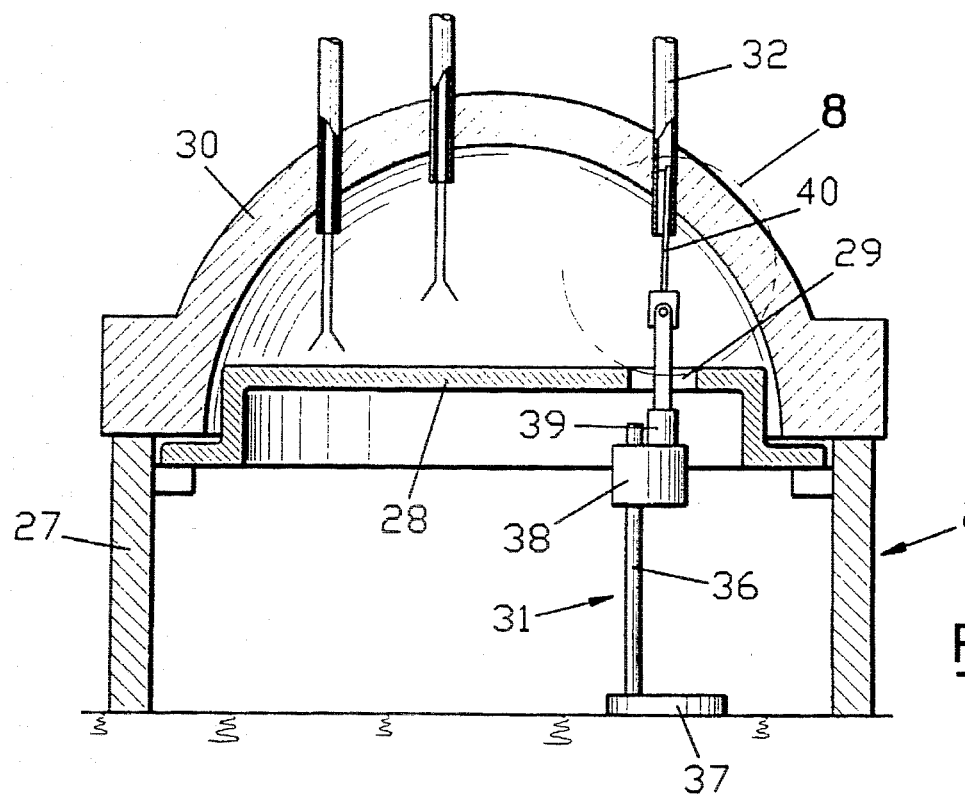
FIG. 7 is a view in section through a vertical plane of a closure head, during coating of the inner surface of an adapter using a process in accordance with the invention.
Figure 8:
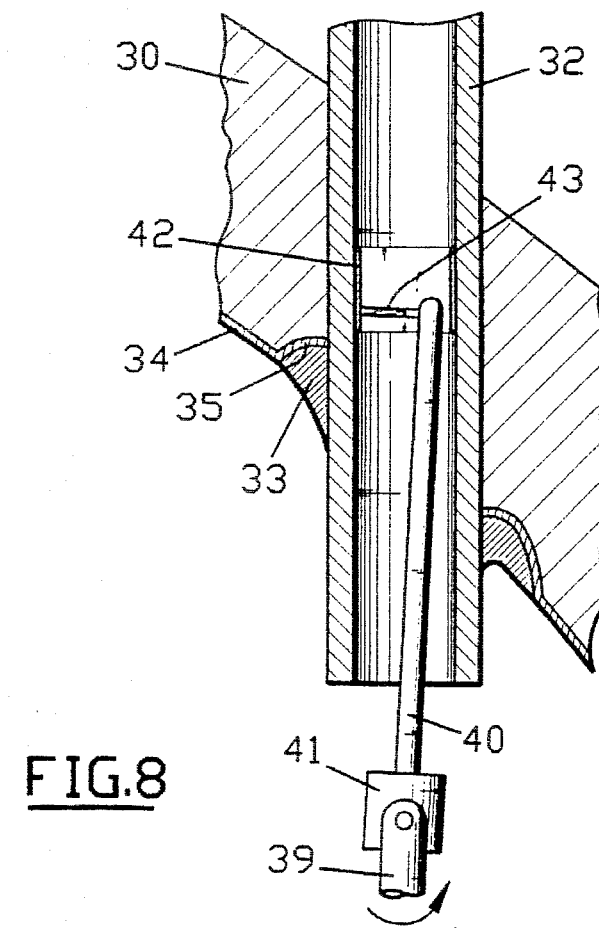
FIG. 8 is a larger scale view of the detail 8 of FIG. 7.

FIGS. 7 and 8 show the vessel closure head 30 of a pressurized water nuclear reactor in position for inspection and repair on a stand 26 comprising vertical supports 27 on which the closure head 30 can be deposited and fastened after dismantling and separation from the nuclear reactor vessel, during a shutdown for repair and refuelling of the reactor.

In addition to the supports 27 for the closure head 30, the inspection stand 26 comprises a biological protection wall 28 pierced with an opening 29 making it possible to introduce into the inside of an adapter 32 passing through the closure head the end part of a servicing device 31 consisting of a semitransferred arc plasma torch. A leakproof coating layer can thus be produced using a process in accordance with the invention inside an adapter 32 made of nickel alloy, in its region of connection to the closure head.

As can be seen in FIG. 8, the inner lower surface of the closure head 30 of hemispherical shape is coated with a covering layer 34 and comprises, around the passage opening of the adapter 32, a cavity 35 which is also covered with a coating layer.

The wall of the closure head 30 is made of a low-alloy steel of the same grade as the shells of the nuclear reactor vessel. The internal coating layer 34 of the vessel is made of stainless steel; the cavity 35 is covered with a buttering layer made of nickel alloy of a grade similar to that of the adapter 32. A connecting weld 33 can thus be produced between the adapter 32 consisting of a tubular component made of nickel alloy and the low-alloy steel closure head 30.

After the nuclear reactor has been operating for some time, cracks have been detected on the inner surface of the adapter, in particular in the region close to the weld 33, and also some cracking outside the adapter 2 in the region of weld 33.

The coating process in accordance with the invention, by employing a device as shown in FIGS. 7 and 8, makes it possible to produce a perfectly leakproof coating layer on the inner surface of the adapter 32, and in particular in the region of this inner surface close to the weld 33. This avoids subsequent cracking of the wall of the adapter when the reactor is in service.

Figure 9:
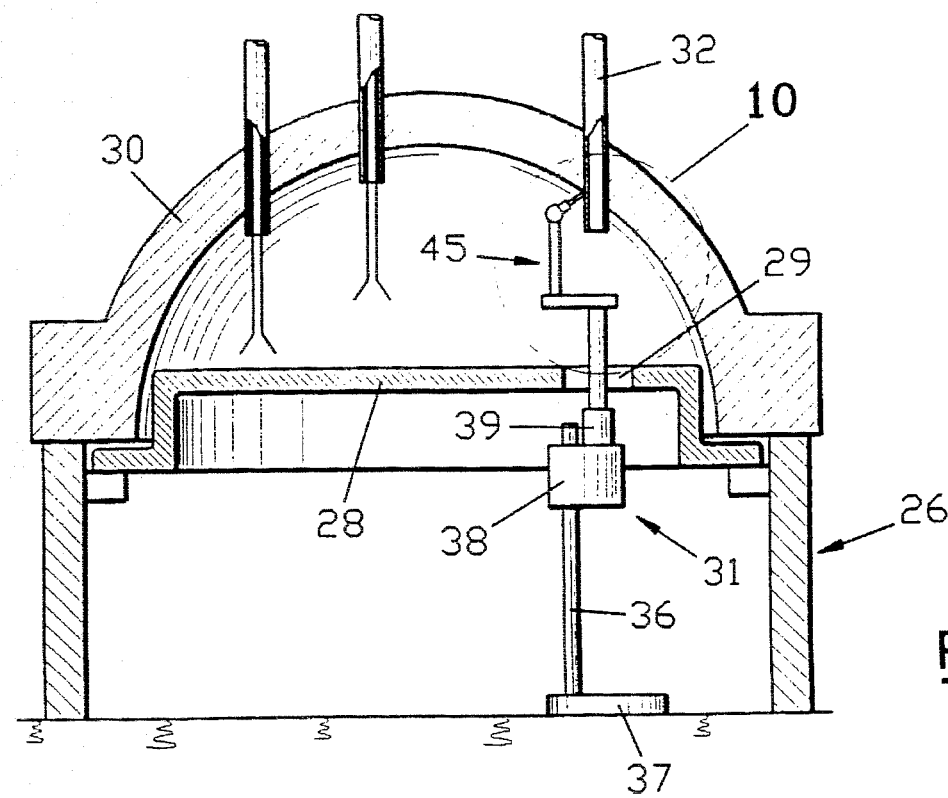
FIG. 9 is a view in section through a vertical plane of a closure head of a pressurized water nuclear reactor during coating of the outer weld for fastening an adapter passing through the closure head, using a process in accordance with the invention.
Figure 10:
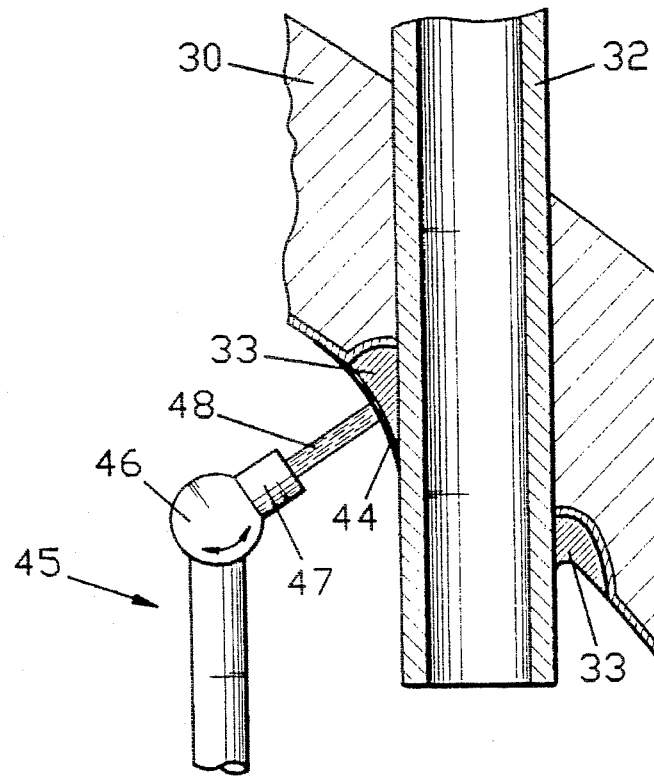
FIG. 10 is an enlarged view of the detail 10 of FIG. 9.

The process in accordance with the invention, by employing the device shown in FIGS. 9 and 10 makes it possible to produce a perfectly leakproof coating layer outside the adapter, in the region connecting the adapter 32 and the closure head 30 comprising the heterogeneous weld 33.

The servicing device 31 placed inside the stand 26 comprises a vertical guiding column 36 attached to a support 37 resting on the floor of the stand 26 and a motor-driven platform 38 capable of moving vertically along the column 36.

A vertical support 39 is mounted for rotation about its axis on the platform 38.

A semitransferred arc plasma torch 40 which has a nozzle of elongate shape which has a diameter appreciably smaller than the internal diameter of the adapter 32 is fastened to the upper end of the vertical support 39 by means of an articulation 41 which can be seen in FIG. 8.

The plasma torch 40 can be introduced inside the adapter 32 with an adjusted inclination so that the nozzle for ejecting the plasma jet 43 is at the desired distance from the inner wall of the adapter 32.

The movement in translation in the vertical direction of the platform 38 and in rotation of the support 39 carried by the platform 38 makes it possible to scan the inner surface of the adapter 32 with the plasma jet, throughout the desired region.

A nickel-chromium alloy powder is introduced into the plasma jet so that a protective layer 42 is deposited inside the adapter 22 in the desired region, and in particular at the weld 33.

In the case of an adapter made of a nickel alloy whose stress corrosion resistance in contact with the reactor coolant fluid has been found insufficient, it has thus been possible to improve considerably the cracking behavior of the adapters by depositing on their inner surface, in particular in the region of welding to the closure head, a layer of a nickel alloy which has a higher chromium content than the alloy forming the wall of the adapter.

In addition, the coating layer 42 produced on the inner surface of the adapter is perfectly leakproof and makes it possible to completely the inner surface of the adapter from the reactor coolant fluid consisting of pressurized water.

The process in accordance with the invention can be employed equally well for carrying out a preventive treatment of the inner surface of the adapters, before any appearance of cracking, and for carrying out a curative treatment after the appearance of cracks.

In this case, the cracks are blocked and covered with a perfectly leakproof and homogeneous layer of nickel-chromium alloy.

Checks performed on the layer 42 produced by the process in accordance with the invention show that the alloy layer deposited inside the nickel alloy adapter is perfectly adherent and perfectly homogeneous.

FIGS. 9 and 10 show a device which makes it possible to produce a protective layer 44 inside the adapter 32 so as to cover the region of connection between the adapter 32 and the closure head 30 comprising the weld 33.

The upper end part of vertical support 39 of the servicing device 31 carries the plasma torch 45 which comprises a vertical support placed in an offset position in relation to the axis of rotation of the support 39.

The nozzle 47 of the plasma torch 45 is fastened in an articulated manner to the upper part of the torch 45 by means of a motor-driven articulation 46.

In this way the nozzle 47 produces a plasma jet 48 into which a nickel-chromium alloy powder is injected, and which can be pointed towards any point of the outer surface of the region connecting the adapter 32 and the closure head 30 comprising the weld 33.

It is thus possible to scan the outer surface of the connection region to carry out the deposition of a protective coating layer 44.

By simultaneously moving the support 39 in rotation and the platform 38 in translation, it is possible to scan the whole connection region around the end part of the adapter 32 projecting below the closure head 30.

The layer produced by the process of the invention has been found to be perfectly homogeneous and adherent. This layer, which is completely leakproof, ensures effective protection against the cracking corrosion of the region of connection of the adapter, when the nuclear reactor is in service.

The process in accordance with the invention, employing the semitransferred arc technique, makes it possible to produce coatings whose thickness is between 0.5 and 1 mm, in the case of applications to components for a nuclear reactor as described above.

The nickel-chromium alloy employed, in particular in the case of the covering of the adapters and of their connection region, may be an alloy with a composition close to the alloy known under the trade name "Alloy 690".

The semitransferred arc technique allows the coating metal to be sprayed with force against the surface of the components to be coated, because of the use of a plasma-forming gas under pressure, with the result that the coating layer can be bonded to the surface of the components without surface remelting of these components. In this respect, this technique is completely different from prior art welding or coating techniques.

When employed for producing local protection of the parts of the primary system of a nuclear reactor, the process in accordance with the invention ensures that the lifetime of the reactor is extended, by limiting or eliminating the risks of cracking of the wall of the component in contact with a fluid which may be the primary coolant fluid of the reactor.

The process in accordance with the invention is particularly effective for limiting the risks of cracking corrosion in the parts of the reactor which are in contact with the primary coolant fluid, i.e., welds or coatings containing high proportions of nickel.

The invention can be applied generally to the protection of metal surfaces of components of a nuclear reactor made of a steel or alloy containing nickel.

The deposition of the coating may be carried out by employing a device other than those which have been described and, in particular, comprising means for moving the plasma torch which differ from those which have been described and are adapted to the shape and the position of the parts of the nuclear reactor components on which the deposition is carried out.

The parameters for adjusting the semitransferred arc plasma torch may vary and be adapted to the characteristics of the coating to be produced. These parameters are, in particular, the difference in potentials between the anode of the plasma torch and the components to be coated, the electrical power transmitted between the electrodes of the torch and between the anode and the components to be coated, and the flow rate and the pressure of the plasma-forming gas ensuring the entrainment of the coating metal in the molten state.

However, in all cases the pressure and the flow rate of the gas for forming the plasma must be sufficient to ensure entrainment of the molten coating metal in conditions corresponding to the semitransferred arc technique.

In general, the invention applies to the coating of many parts of the components of a nuclear reactor which are exposed to a cracking corrosion in service.

I claim:

1. Process for producing a leakproof protective coating on a surface of a component of a nuclear reactor intended to bear cracking in the operating reactor comprising scanning the surface of the component with a jet of a semitransferred arc plasma torch, introducing a metal powder in said jet and controlling said plasma jet, conditions of introduction of metal powder and conditions of scanning, for ejecting and fixing the metal powder onto the surface of the component without melting the surface of the component, thus resulting in a dense, homogeneous and leakproof coating layer of a thickness of at most 1 mm.

2. Process according to claim 1 comprising maintening the distance between an outlet nozzle of the plasma torch and the surface of the component to be coated between 20 and 80 mm.

3. Process in accordance with claim 1, comprising fixing the metal powder on a surface of a zone of connection by welding of the component to a second component of the nuclear reactor.

4. Process in accordance with claim 1 wherein the nuclear reactor component is made of a material containing nickel and that the metal powder introduced into the plasma jet contains nickel and chromium.

5. Process in accordance with claim 1 wherein the coating layer deposited on the surface of the nuclear rector component has a thickness of between 0.5 and 1 mm.

6. Process in accordance with claim 1 comprising fixing the metal powder in the form of a coating layer on the outer surface of a region of connection between a primary pipe and a nozzle of a pressurized water nuclear reactor.

7. Process in accordance with claim 1 comprising fixing the metal powder in the form of a coating layer on the internal surface of an adapter passing through the reactor vessel head of a pressurized water nuclear reactor.

8. Process in accordance with claim 1 comprising fixing the metal powder in the form of a coating layer in a region of welding connection between an adapter passing through a closure head of a pressurized water nuclear reactor and the closure head.

9. Device for coating the outer surface of a region of connection between a nozzle of the vessel of a pressurized water nuclear reactor and a pipe of the primary system of the reactor, comprising an annular guiding rail fastened in a coaxial arrangement to the outer surface of the primary pipe in the vicinity of the region of connection, a trolley mounted so as to move on the annular rail, a column for guiding a platform in a radial direction of the primary pipe, a support mounted so as to move on the platform in an axial direction of the primary pipe and motor-driven means for moving the platform, the trolley and the support, so as to move the support in rotation about the axis of the primary pipe in a radial direction and in an axial direction in relation to the pipe, and means for fastening a plasma torch or an ultrasonic testing head to the support.

10. Device for producing a protective coating on the inner surface of a tubular adapter passing through the reactor vessel head of a pressurized water nuclear reactor, the reactor vessel head being deposited on a servicing stand and accessible from below through an opening in a protective wall, comprising a vertical column fastened to a support resting on a supporting surface of the stand below an adapter in vertical position, a platform mounted so as to move in the vertical direction on the column, a vertical support mounted so at to rotate about a vertical axis on the platform and a semitransferred arc plasma torch fastened to an upper end of the rotary support.

11. Device for producing a protective coating on a surface of a region of welding connection of an adapter passing through a closure head of a pressurized water nuclear reactor arranged on a servicing stand so that the connection region of the adapter is accessible from below the closure head through an opening in a biological isolation wall of the stand, comprising a column integrally attached to a support resting on a horizontal surface of the stand situated below the opening and the adapter, a platform movable in the vertical direction on the column, a vertical support movable in rotation about a vertical axis on the platform and a semitransferred arc plasma torch comprising a nozzle for ejecting a plasma jet and mounted so that it pivots at one end of the torch fastened in a vertical arrangement to the support.

* * * * *